(No Model.)

G. MÖSSNER.
HANDLE FOR STEW PANS.

No. 468,710. Patented Feb. 9, 1892.

Witnesses
E. L. Clemens
A. J. Haddau

Inventor
Gustav Mössner
by his Attorney R. Haddau

UNITED STATES PATENT OFFICE.

GUSTAV MÖSSNER, OF STUTTGART, GERMANY.

HANDLE FOR STEW-PANS.

SPECIFICATION forming part of Letters Patent No. 468,710, dated February 9, 1892.

Application filed November 21, 1890. Serial No. 372,245. (No model.)

*To all whom it may concern:*

Be it known that I, GUSTAV MÖSSNER, a subject of the King of Würtemberg, residing at Stuttgart, Würtemberg, Germany, have invented a certain new and useful Movable Handle or Implement for Holding Stew-Pans and other Like Vessels, of which the following is a specification.

The object of this invention is an implement adapted to be used to grasp or hold a saucepan, stew-pan, or other like utensil or vessel used in cooking or in other process when from any cause it is desirable to provide an implement for seizing and holding any vessel for manipulation thereof without direct contact of the operator with any part of the vessel.

Figure 1:
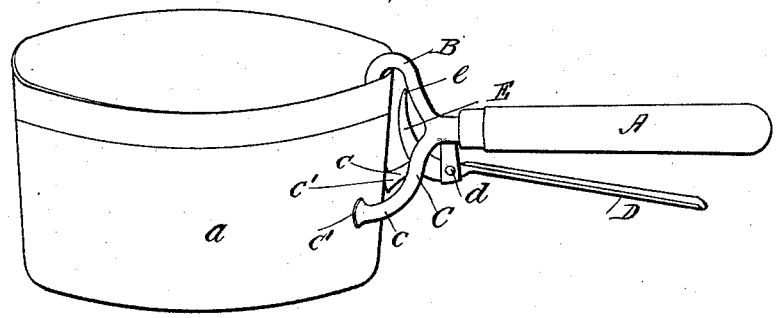
Figure 2:
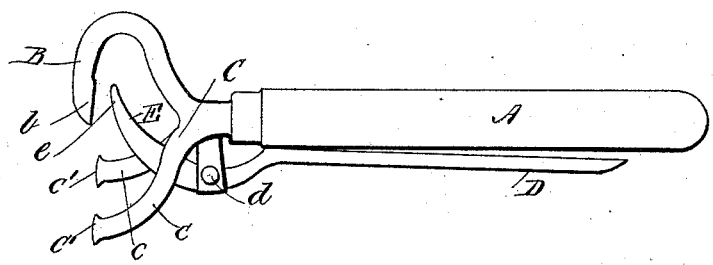
Figure 3:
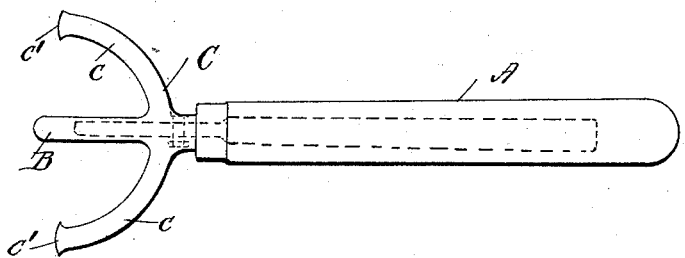

The improved implement is shown in the accompanying drawings, Figure 1 being a perspective view of a cooking-vessel, such as a stew-pan, with the implement placed thereon ready to grasp the vessel and serve as a temporary handle thereto. Fig. 2 is a side elevation, and Fig. 3 is a plan, of the implement on a larger scale.

The implement consists of a handle A of suitable length, carrying at its end an upwardly-bent tongue curved to return downward, so as to form a hook B, adapted to be placed over the rim of a vessel $a$ in Fig. 1. Underneath said tongue is a downward-projecting part C, preferably in the form of a fork consisting of two curved bars $c\,c$, adapted to lie against the outer surface of the vessel and be in contact therewith at at least two points $c'\,c'$ on a horizontal line below the level of the contact-point $b$ of the hook B within the vessel. Underneath the handle A is hinged or pivoted at $d$ a second handle or lever D, having an arm E extending so that when the handles A and D are pressed together by the grasp of the hand the said arm E presses against the outer surface of the vessel at a point $e$ opposite to the contact-point $b$ of the hook B within the vessel, or, if desired, slightly above the level of said contact-point—that is to say, in such a position as to cause the implement to firmly grasp the vessel at the points $b\,c'\,c'\,e$ and serve as a temporary handle for lifting and manipulating the vessel.

I claim—

The combination of the handle A, hook B, having the contact-point $b$, the downwardly-projecting part C, having bifurcations $c\,c$ and points $c'\,c'$, and the lever D, having jaw E, with the point $e$, all constructed as described.

In witness whereof I have signed this specification in presence of two witnesses.

GUSTAV MÖSSNER.

Witnesses:
 CARL KAUFMANN,
 A. SMITH.